United States Patent
Harris

(10) Patent No.: US 10,596,976 B2
(45) Date of Patent: Mar. 24, 2020

(54) ACCESSORY ASSEMBLY FOR ATTACHMENT TO A SEATBACK

(71) Applicant: Victor Harris, Dubai (AE)

(72) Inventor: Victor Harris, Dubai (AE)

(73) Assignee: NSV Group FZCO, Dubai (AE)

( * ) Notice: Subject to any disclaimer, the term of this patent is extended or adjusted under 35 U.S.C. 154(b) by 277 days.

(21) Appl. No.: 15/341,999

(22) Filed: Nov. 2, 2016

(65) Prior Publication Data

US 2017/0120840 A1 May 4, 2017

Related U.S. Application Data

(60) Provisional application No. 62/249,933, filed on Nov. 2, 2015.

(51) Int. Cl.
| | | |
|---|---|---|
| *B60R 7/10* | (2006.01) | |
| *B60R 11/02* | (2006.01) | |
| *B60R 11/00* | (2006.01) | |

(52) U.S. Cl.
CPC ............... *B60R 11/02* (2013.01); *B60R 7/10* (2013.01); *B60R 11/0229* (2013.01); *B60R 2011/0015* (2013.01); *B60R 2011/0017* (2013.01); *B60R 2011/0064* (2013.01)

(58) Field of Classification Search
CPC .................................. B60R 11/02; B60R 7/10
USPC ...................................................... 297/217.3
See application file for complete search history.

(56) References Cited

U.S. PATENT DOCUMENTS

| | | | | |
|---|---|---|---|---|
| 9,457,731 | B2* | 10/2016 | Narayanan | ............... B60R 11/02 |
| 9,758,248 | B2* | 9/2017 | Procter | ............... B60R 11/0235 |
| 2006/0079306 | A1* | 4/2006 | Zheng | ................. B60R 11/0235 |
| | | | | 455/575.9 |
| 2011/0278885 | A1* | 11/2011 | Procter | ............... B60R 11/0235 |
| | | | | 297/135 |
| 2012/0018471 | A1 | 1/2012 | Guillermo et al. | |
| 2014/0015289 | A1 | 1/2014 | Fan | |
| 2014/0077576 | A1 | 3/2014 | Brawner | |

FOREIGN PATENT DOCUMENTS

| | | |
|---|---|---|
| DE | 202004008205 U1 | 8/2004 |
| DE | 102005058113 A1 | 6/2006 |
| DE | 202012010244 U1 | 1/2013 |
| WO | 2015077834 A1 | 6/2015 |

OTHER PUBLICATIONS

Mike Newman, "Cool Material", accessed on May 31, 2017 at https://web.archive.org/web/20160812201446/http://coolmaterial.com/tech/the-sound-stripp-lets-you-hang-your-headphones-and-save-desk-space/, Aug. 12, 2016, 5 pages.

(Continued)

*Primary Examiner* — Anthony D Barfield
(74) *Attorney, Agent, or Firm* — Quinn IP Law

(57) ABSTRACT

An accessory assembly includes a support structure configured to attach to a seat of a vehicle. The accessory assembly also includes an electronic device supported by the support structure. The electronic device includes a screen. The accessory assembly further includes a hanger coupled to the support structure and spaced from the screen such that the hanger does not obstruct the screen.

19 Claims, 7 Drawing Sheets

(56) References Cited

OTHER PUBLICATIONS

"3M DH445 Flat Panel Copy Holder", accessed on May 31, 2017 at https://web.archive.org/web/20160303002521/http://www.cos.net.au:80//Computer-Accessories/Workspace-Accessories/3M-DH445-Flat-Panel-Copy-Holder-Clear-COPY2070, Mar. 3, 2016, 1 page.
Image, accessed on May 31, 2017 at https://web-beta.archive.org/web/20160409032154/http://i.imgur.com/UjK8eRM.pg, Apr. 9, 2016, 1 page.
International search report for international application EP16861685.

* cited by examiner

ACCESSORY ASSEMBLY FOR ATTACHMENT TO A SEATBACK

CROSS REFERENCE TO RELATED APPLICATIONS

This application claims the benefit of and priority to U.S. Provisional Patent Application No. 62/249,933, filed on Nov. 2, 2015, which is hereby incorporated by reference in its entirety.

TECHNICAL FIELD

The present disclosure relates to an accessory assembly for attachment to a seatback.

BACKGROUND

Electronic devices, such as smart phones, tablets, personal digital assistants (PDAs), global position systems (GPS), and the like are widely used by passengers of vehicles. Some of these electronic devices provide the benefit of portability, allowing the passengers to bring the device with them, for use in the vehicle, while also allowing the passengers to take the device with them as they exit the vehicle. Other electronic devices can be integrated into the vehicle.

SUMMARY

The present disclosure provides an accessory assembly including a support structure configured to attach to a seat of a vehicle. The accessory assembly also includes an electronic device supported by the support structure. The electronic device includes a screen. The accessory assembly further includes a hanger coupled to the support structure and spaced from the screen such that the hanger does not obstruct the screen.

The present disclosure also provides an accessory assembly including a support structure configured to attach to a seat of a vehicle. The accessory assembly also includes a hanger coupled to the support structure and configured to attach to an electronic device.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 2:
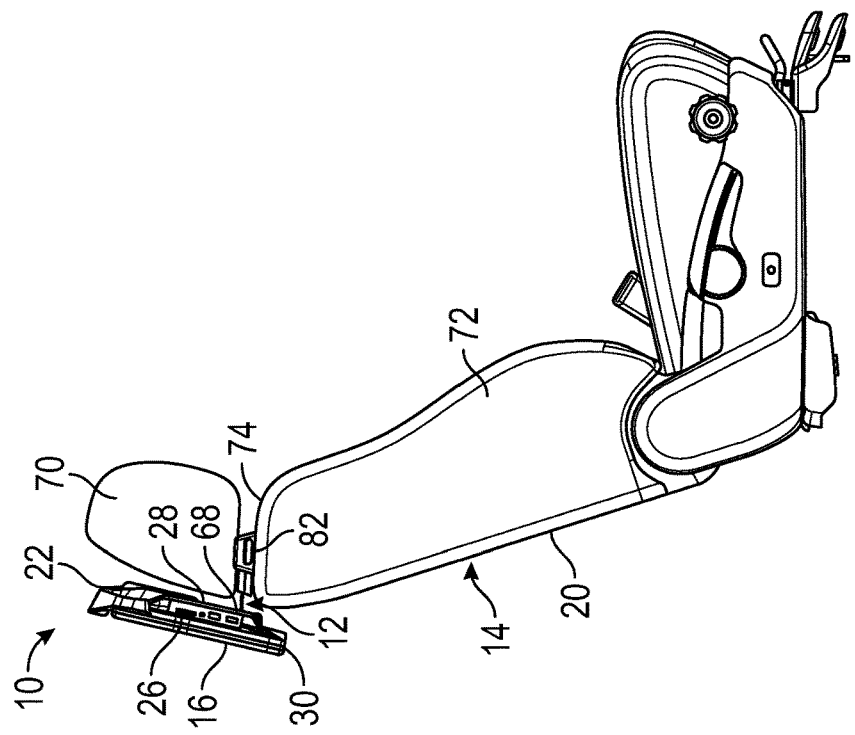
FIG. 2 is a schematic side view of the accessory assembly attached to the seat of FIG. 1.
Figure 1:
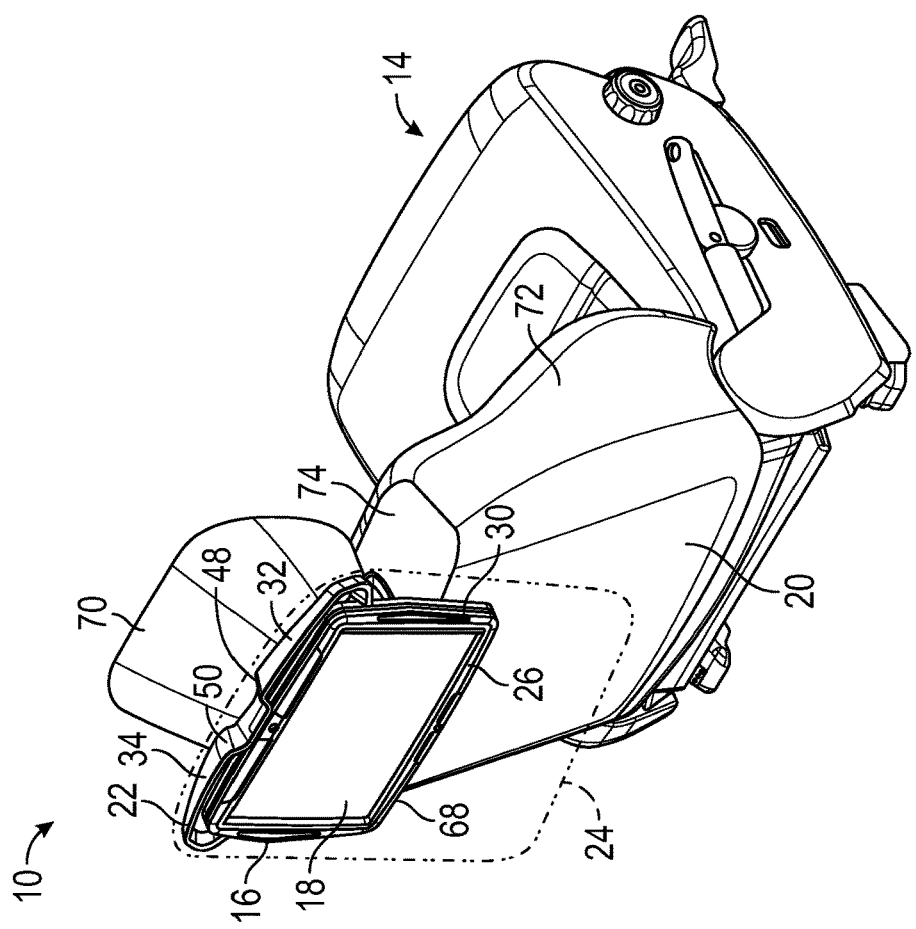
FIG. 1 is a schematic perspective view of an accessory assembly including an electronic device and a hanger, with the electronic device attached to a seat, illustrating the hanger being configured to support clothing.

Referring to the Figures, wherein like numerals indicate like or corresponding parts throughout the several views, an accessory assembly 10 is generally shown in FIGS. 1 and 2.

As best shown in FIG. 2, the accessory assembly 10 includes a support structure 12 configured to attach to a seat 14 of a vehicle. The seat 14 can be any suitable configuration and FIGS. 1 and 2 illustrate one non-limiting example. The support structure 12 can include one or more pieces, some of which are discussed further below.

Continuing with FIG. 2, the accessory assembly 10 also includes an electronic device 16 supported by the support structure 12. The electronic device 16 can include a video screen, a personal digital assistant (PDA), a global position system, a tablet, a smart phone, a cell phone, a handheld electronic device such as a tablet or a smart phone, etc. The electronic device 16 can be permanently attached to the support structure 12, i.e., remain in the vehicle, or the electronic device 16 can be removable from the support structure 12, i.e., removable from the vehicle.

As shown in FIG. 1, the electronic device 16 includes a screen 18. The screen 18 provides a visual area for a user to view. Generally, as shown in FIGS. 1 and 2, the electronic device 16 is attached to the seatback located behind the seat 14. Said differently, the electronic device 16 can be located relative to a rear side 20 of the seat 14. Therefore, the electronic device 16 can face a back seat of the vehicle, and thus, can provide entertainment to a passenger located in the back seat.

Referring to FIG. 2, the accessory assembly 10 further includes a hanger 22 coupled to the support structure 12. The support structure 12 can include a holder configured to support the electronic device 16 and the hanger 22 when the electronic device 16 is attached to the vehicle. The hanger 22 can also be configured to attach to the holder.

Furthermore, the hanger 22 can be configured to attach to the electronic device 16. The hanger 22 is configured to hang clothing 24 thereon (see phantom lined box 24 in FIG. 1 to generally illustrate clothing 24 covering the hanger 22 and the electronic device 16). With reference to FIG. 1, the hanger 22 can include a first portion 32 and a second portion 34 extending away from the first portion 32 such that the hanger 22 can be shaped as human shoulders and configured such that clothing 24 can be supported by the portions 32, 34. The clothing 24 can be a coat, a shirt, a suit jacket, etc., that can be hung on the hanger 22. When clothing 24 is disposed on the hanger 22, the screen 18 can be partially or completely covered or blocked. Therefore, if the hanger 22 is being utilized to hang clothing 24, the screen 18 of the electronic device 16 may not be visible. The hanger 22 being integrated with the assembly 10, as described herein, provides space savings and an aesthetic pleasing appearance inside a passenger compartment of the vehicle. Additionally, the hanger 22 being attached to the electronic device 16 eliminates the need to have a separate hanger in another location in the vehicle.

Turning to FIGS. 1 and 2, the electronic device 16 includes a first side 26 and a second side 28 opposing the first side 26. A peripheral edge 30 connects the first side 26 and the second side 28 to at least surround the electronic device 16. The screen 18 is disposed on the first side 26, and the support structure 12 can each engage or otherwise extend from the second side 28. It is to be appreciated that the support structure 12 can extend from any portion of the electronic device 16. Therefore, when the electronic device 16 is supported by the support structure 12, the first side 26 faces away from the seat 14 and the second side 28 faces the seat 14.

Figure 3:
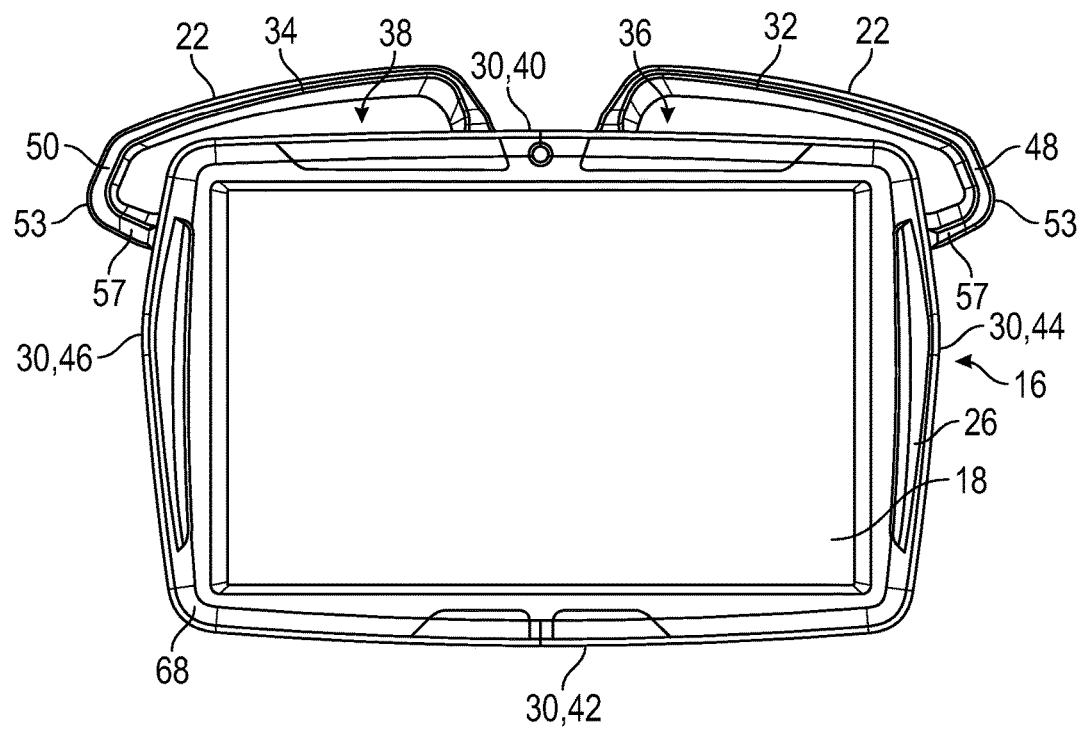
FIG. 3 is a schematic front view of the electronic device and the hanger.

The hanger 22 is attached to the electronic device 16 such that the first portion 32 and the second portion 34 are spaced from the screen 18 (see FIG. 3). Therefore, the hanger 22 is offset from the screen 18, thus allowing the entire screen 18 to be viewable, without obstructions, to provide a pleasurable viewing experience.

Referring again to FIGS. 1 and 2, the electronic device 16 is attached to the support structure 12, and the hanger 22 is attached to the electronic device 16. The hanger 22 can be disposed in any suitable location relative to the electronic device 16 such that the hanger 22 does not obstruct the screen 18. Furthermore, the hanger 22 is located away from a floor of the vehicle to position the clothing 24 away from the floor.

Figure 4:
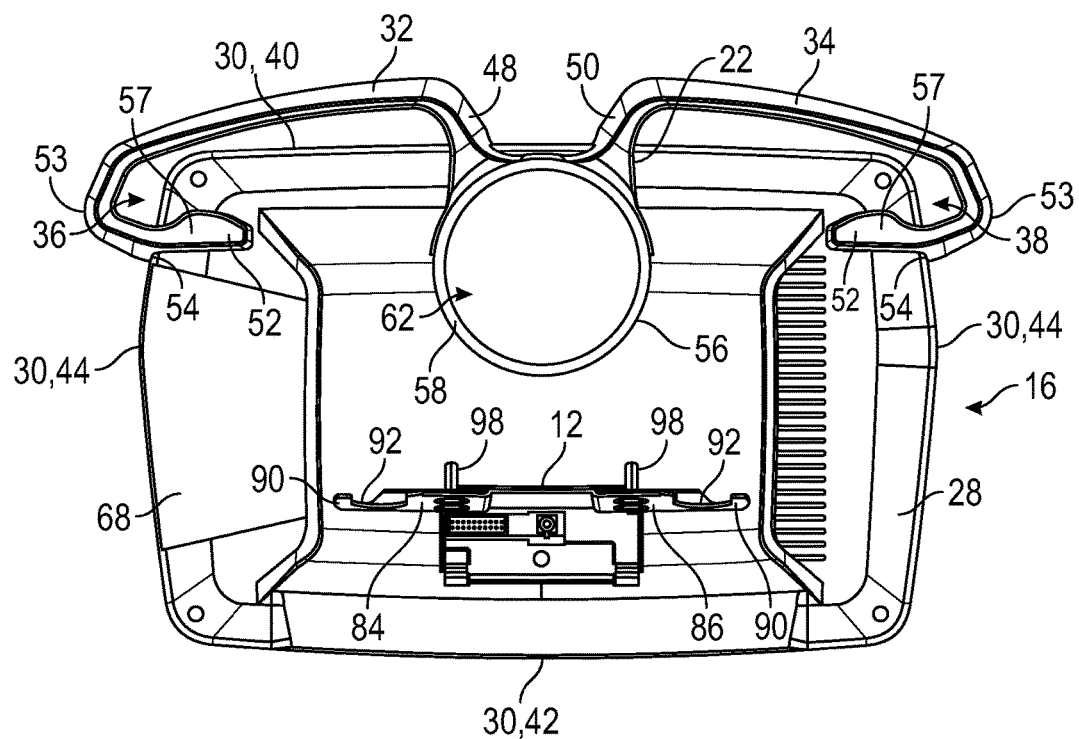
FIG. 4 is a schematic backside view of the electronic device and the hanger, which also illustrates a support structure.

As best shown in FIGS. 1 and 3, at least the first portion 32 and the second portion 34 can be disposed above the peripheral edge 30 of the support structure 12. Additionally, as shown in FIGS. 3 and 4, the first portion 32 and the second portion 34 each extend at least partially beyond the peripheral edge 30 such that a first opening 36 is defined between the first portion 32 and the peripheral edge 30, and a second opening 38 is defined between the second portion 34 and the peripheral edge 30. Generally, the first and second portions 32, 34 of the hanger 22 can support the clothing 24.

As discussed above, the electronic device 16 can include the peripheral edge 30. More specifically, the peripheral edge 30 of electronic device 16 can include a first edge 40 and a second edge 42 opposing each other and spaced apart from each other; and the electronic device 16 can include a third edge 44 and a fourth edge 46 opposing each other and spaced apart from each other. The first and second edges 40, 42 are each disposed adjacent to the third and fourth edges 44, 46 such that the first, second, third and fourth edges 40, 42, 44, 46 cooperate to present the peripheral edge 30 having a generally perpendicular shape. In certain embodiments, the hanger 22 can engage the third and fourth edges 44, 46 and be spaced from the first and second edges 40, 42. In other embodiments, the hanger 22 can engage the first, third and fourth edges 40, 44, 46 and be spaced from the second edge 42.

Figure 6:
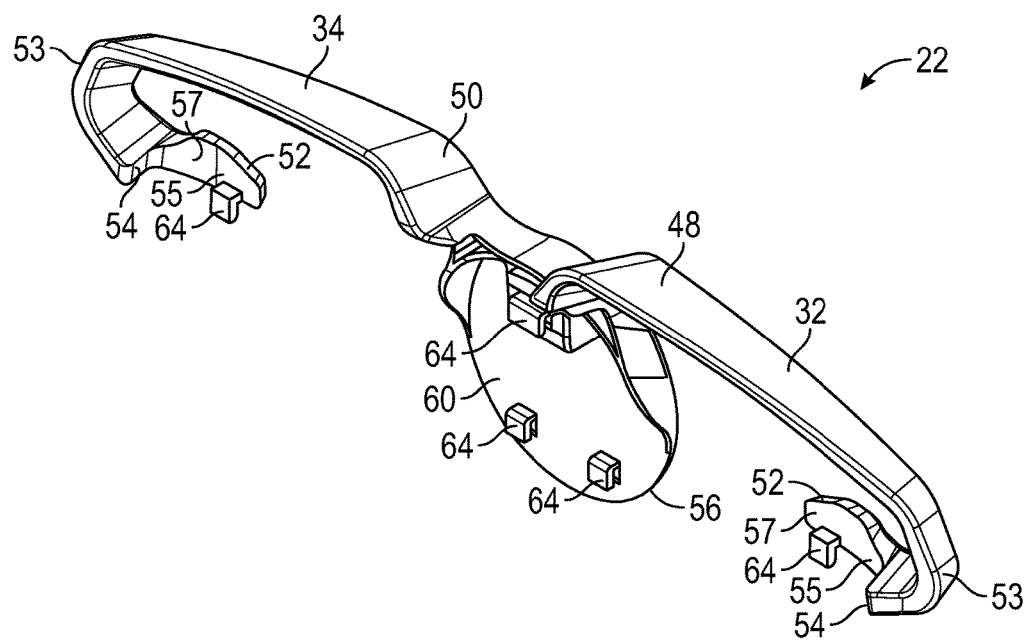
FIG. 6 is a schematic perspective view of the hanger.

Referring to FIG. 6, the hanger 22 includes a body 56. A first arm 48 and a second arm 50 extend from the body 56 in opposite directions from one another. More specifically, each arm 48, 50 is generally hook-shaped and includes a respective first or second portion 32, 34, an elbow 53, and a hand 57. One of the hands 57 extends from the respective elbows 53 to the distal end 52, such that the hands 57 extend toward one another. Referring again to FIG. 6, each hand 57 presents a first surface 54 and a second surface 55, such that the first and second surfaces 54, 55 extend from one another generally perpendicularly from one another. Therefore, with reference to FIGS. 4 and 6, when the hanger 22 is attached to the electronic device 16, the first surface 54 may be disposed in facing relationship to the respective edge 44, 46 and the second surface 55 may be disposed in facing relationship to the second side 28. More specifically, the first surface 54 of the arms 48, 50 can engage or abut respective third and fourth edges 44, 46 of the electronic device 16, and accordingly, the second surface 55 of the arms 48, 50 engage or abut the second side 28 of the electronic device 16.

Further, with reference to FIGS. 3 and 4, when the hanger 22 is attached to the electronic device 12, the first arm 48 and the second arm 50 extend outwardly at least partially beyond the peripheral edge 30 of the electronic device 16, in opposite directions from one another. It should be appreciated that the first and second arms 48, 50 can be any suitable configuration to form the hanger 22 that can support the clothing 24.

Referring again to FIG. 6, a cross-sectional profile of the first portion 32 of the first arm 48 and the second portion 34 of the second arm 50 may taper, or otherwise have a varying cross-sectional size and/or shape.

Referring to FIGS. 2, 4, and 6, the body 56 can include a front side 58 and a back side 60 opposing the front side 58 (see FIGS. 4 and 6). The front side 58 can face the seat 14 and the back side 60 can face the electronic device 16 (see FIG. 2). The front side 58 can include a surface 62 that can be labeled with text, graphics, etc. For example, the surface 62 can be marked to identify a logo, a trademark, etc. The surface 62 can be directly labeled or a separate piece with the label can be attached to the surface 62.

The hanger 22 can include at least one first attachment feature 64 (see FIG. 6), and the electronic device 16 can include at least one second attachment feature 66 (see FIG. 7), with the first and second attachment features 64, 66 cooperating to attach the hanger 22 and the electronic device 16 together. The first and second attachment features 64, 66 can be any suitable configuration to attach the hanger 22 and the electronic device 16, and non-limiting examples can include fasteners, openings, holes, slots, grooves, clips, tabs, snaps, friction or interference fit features, adhesive, welding, soldering, etc. In certain embodiments, the hanger 22 and the electronic device 16 are attached to each other by integrally forming the hanger 22 and the electronic device 16 together as one piece. Therefore, in this embodiment, the hanger 22 and the electronic device 16 cannot separate from each other, i.e., the hanger 22 is permanently attached to the electronic device 16. Therefore, the hanger 22 can be attached and detached from the electronic device 16 in certain embodiments, and alternatively, the hanger 22 cannot be detached from the electronic device 16.

Figure 7:
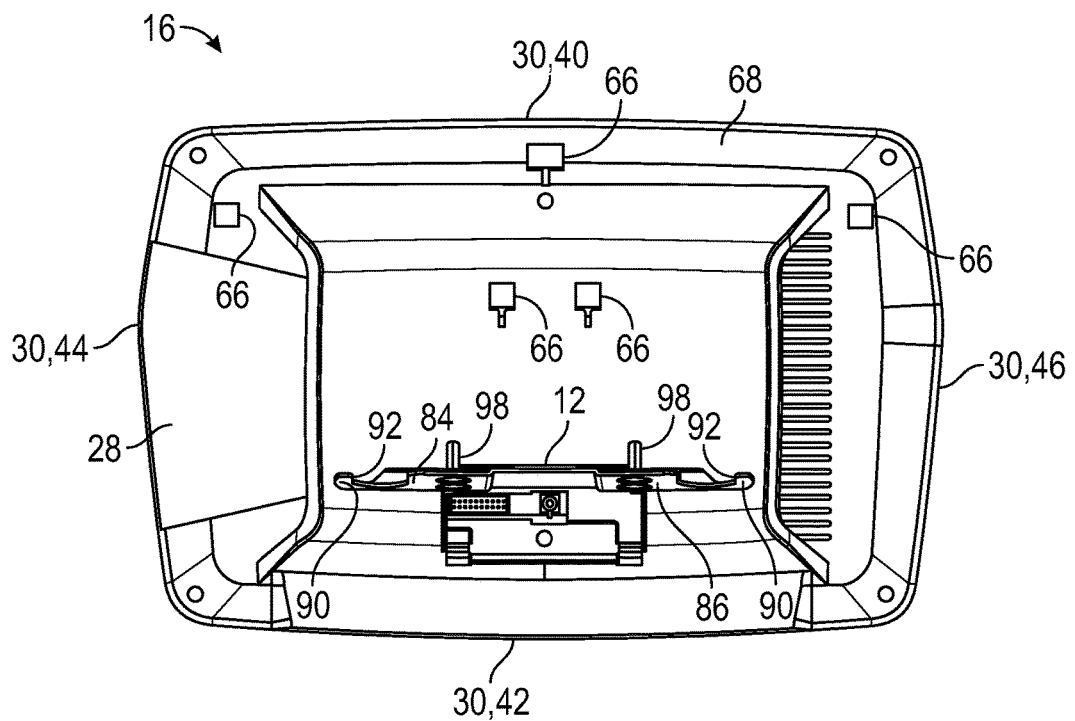
FIG. 7 is a schematic back side view of the electronic device and the support structure.

Referring to FIGS. 6 and 7, the first attachment feature 64 can be further defined as a plurality of first attachment features 64 and the second attachment feature 66 can be further defined as a plurality of second attachment features 66. In this embodiment, one of the first attachment features 64 cooperate with one of the second attachment features 66, another one of the first attachment features 64 cooperate with another one of the second attachment features 66, and so on. As one non-limiting example, the first attachment features 64 of FIG. 6 may be a plurality of clips 64 and the second attachment features 66 of FIG. 7 may be a plurality of holes 66. Therefore, the clips 64 are configured to be inserted into, and interlock with, the respective holes 66 to attach the hanger 22 to the electronic device 16.

It should be appreciated that the first and second attachment features 64, 66 can be in any suitable location on the respective hanger 22 and electronic device 16. For example, one or more of the first attachment features 64 can be disposed along body 56 of the hanger 22. Specifically, one or more of the first attachment features 64 can be disposed along the back side 60 of the body 56. Furthermore, one or more of the first attachment features 64 can be disposed along the first and second arms 48, 50. Referring to the embodiment of FIG. 6, a three of the first attachment features 64 may be disposed along the back side 60 of the body 56, and one first attachment feature 64 is disposed on the first arm 48, proximate the respective distal end 52, and another first attachment feature 64 is disposed on the second arm 50, proximate the respective distal end 52. As such, the second side 28 defines at least an equal number of holes 66, each configured to receive a corresponding one of the clips 64.

As previously described, the first surface 54 of the first and second arms 48, 50 of the hanger 22 can engage the third and fourth edges 44, 46 of the electronic device 16. Additionally, as shown in FIG. 6, at least one of the first attachment features 64 may extend from the second surface 55 of each arm 48, 50. Therefore, one of the first attachment features 64 can be disposed at or proximate the distal end 52 of the first arm 48 and another one of the first attachment features 64 can be disposed at or proximate the distal end 52 of the second arm 50.

Referring to FIG. 6, the electronic device 16 can include a housing 68 that supports the screen 18 and covers the internal components of the electronic device 16. The housing 68 can include the first side 26 and the second side 28, as well as the edges 30, 40, 42, 44, 46 discussed above. The second side 28 of the housing 68 can include the second attachment features 66, and the second attachment features 66 can be located along the second side 28 to complement the location of the first attachment features 64 of the hanger 22.

Referring back to FIG. 1, the support structure 12 is configured to attach to the seat 14, and therefore, the seat 14 is configured to support the electronic device 16 and the hanger 22. The support structure 12 can be detached from the seat 14 to accommodate interchangeability between different accessory support assemblies 10.

Figure 8:
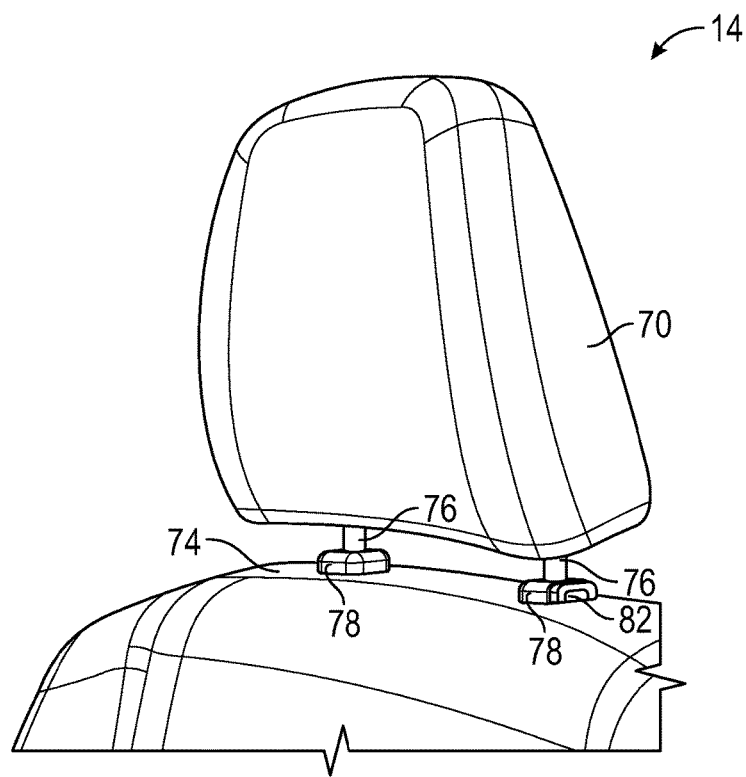
FIG. 8 is a schematic fragmentary perspective view of a seatback and a headrest.

Referring to FIG. 8, the seat 14 can include a headrest 70 configured to support a head of the passenger and a seatback 72 configured to support a back of the passenger. Generally, the headrest 70 is disposed at a top 74 of the seatback 72. Generally, the length of the hanger 22 can be configured to equal to or less than the width of the seatback 72 and/or the headrest 70.

The headrest 70 can include a plurality of struts 76 that slidably extend into the seatback 72 through respective strut holders 78. Therefore, generally, the strut holders 78 can be disposed along the top 74 of the seatback 72. The strut holders 78 can include an opening 80 (best shown in FIG. 9) in which respective struts 76 extend therein. The headrest 70 can be adjustable relative to the seatback 72. In order to facilitate adjustment of the headrest 70, at least one of the strut holders 78 can include a button 82 (see FIGS. 2 and 8) that is configured to be depressed by a passenger of the vehicle. When the button 82 is depressed, the headrest 70 and the struts 76 are slidable within the opening 80 of the strut holders 78, such that the headrest 70 moves toward and/or away from the seatback 72. When the button 82 is released, the headrest 70 is restrained from moving relative to the seatback 72. It is to be appreciated that the headrest 70 can be adjusted by methods other than the button 82.

The headrest 70 can be removed from the seatback 72 prior to attaching the accessory assembly 10 to the seatback 72. As mentioned above, the support structure 12 can include more than one piece. For example, the support structure 12 can include a base member 84 (see FIGS. 2, 4, 5 and 9). The base member 84 can be formed from metal, such as mild steel. However, it should be appreciated that other high strength materials can also be used in forming the base member 84. The base member 84 is formed of any suitable material that can support the electronic device 16, the hanger 22 and any clothing 24 hung on the hanger 22. Therefore, the base member 84 is configured to support the weight of the electronic device 16, the hanger 22 and any clothing 24 hung on the hanger 22. As such, the base member 84 can support cantilever forces, as well as torsional forces.

Additionally, the base member 84 can include a base mount 86 and a support flange 88. The base mount 86 is configured to be supported by the seatback 72. The support flange 88 can extend from the base mount 86 and is configured to couple or attach the support structure 12 to the electronic device 16. In certain embodiments, the support flange 88 is coupled to the second side 28 of the housing 68 of the electronic device 16.

Figure 5:
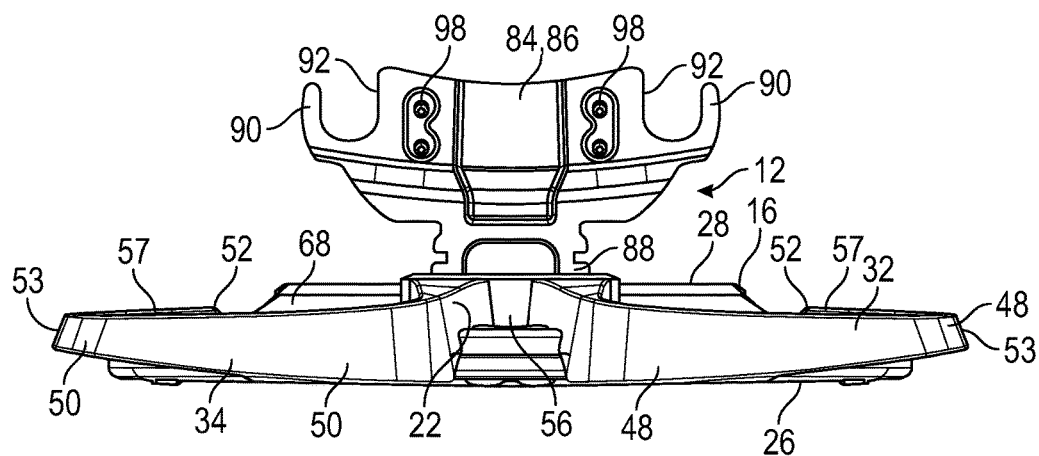
FIG. 5 is a schematic topside view of the electronic device and the hanger, which also illustrates the support structure.
Figure 9:
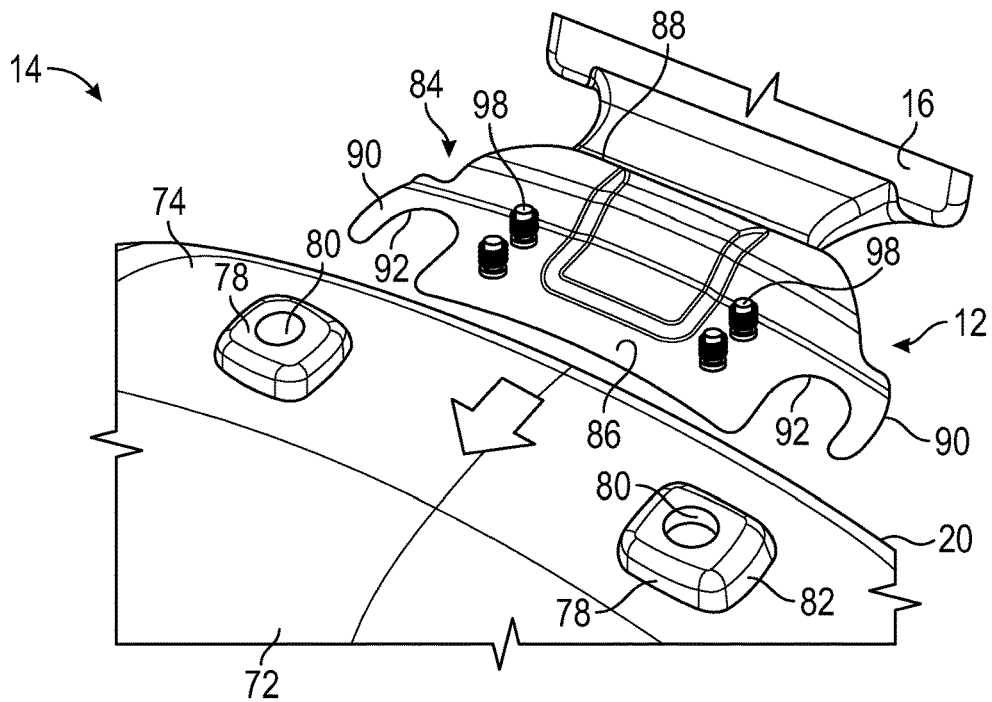
FIG. 9 is a schematic fragmentary perspective view of the seatback and the support structure spaced from the seatback.
Figure 10:
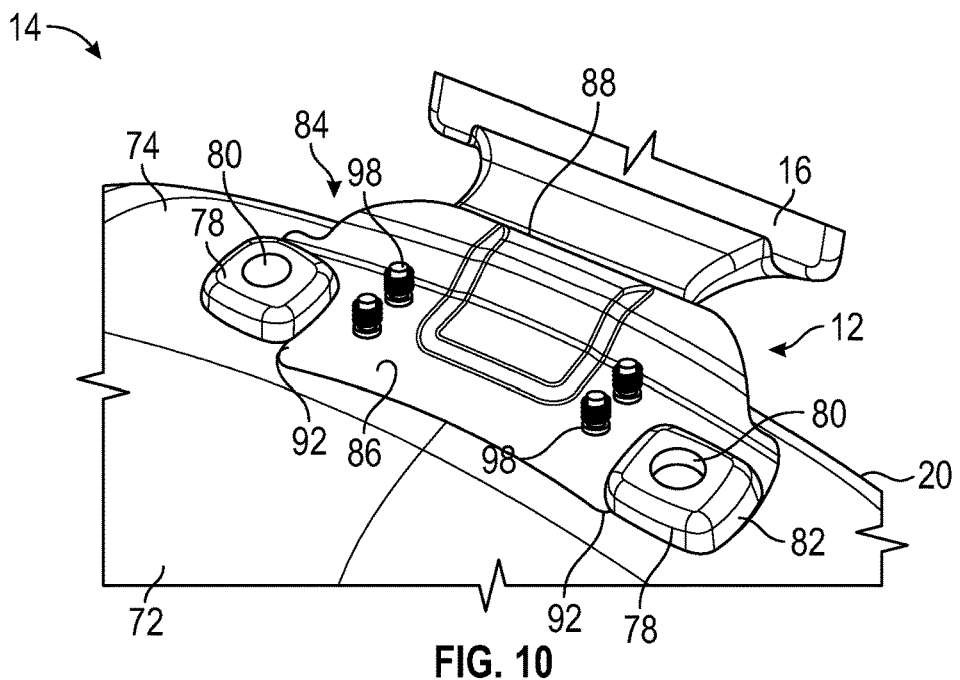
FIG. 10 is a schematic fragmentary perspective view of the seatback and a portion of the support structure overlapping the seatback.

As best shown in FIGS. 5 and 9, the base mount 86 includes a plurality of feet 90, and each of the feet 90 defines a slot 92. Referring to FIGS. 9 and 10, the strut holders 78 are disposed within respective slots 92 between the feet 90 and partially overlap the feet 90. As such, each of the feet 90 are sandwiched between the seatback 72 and the respective strut holders 78.

Figure 11:
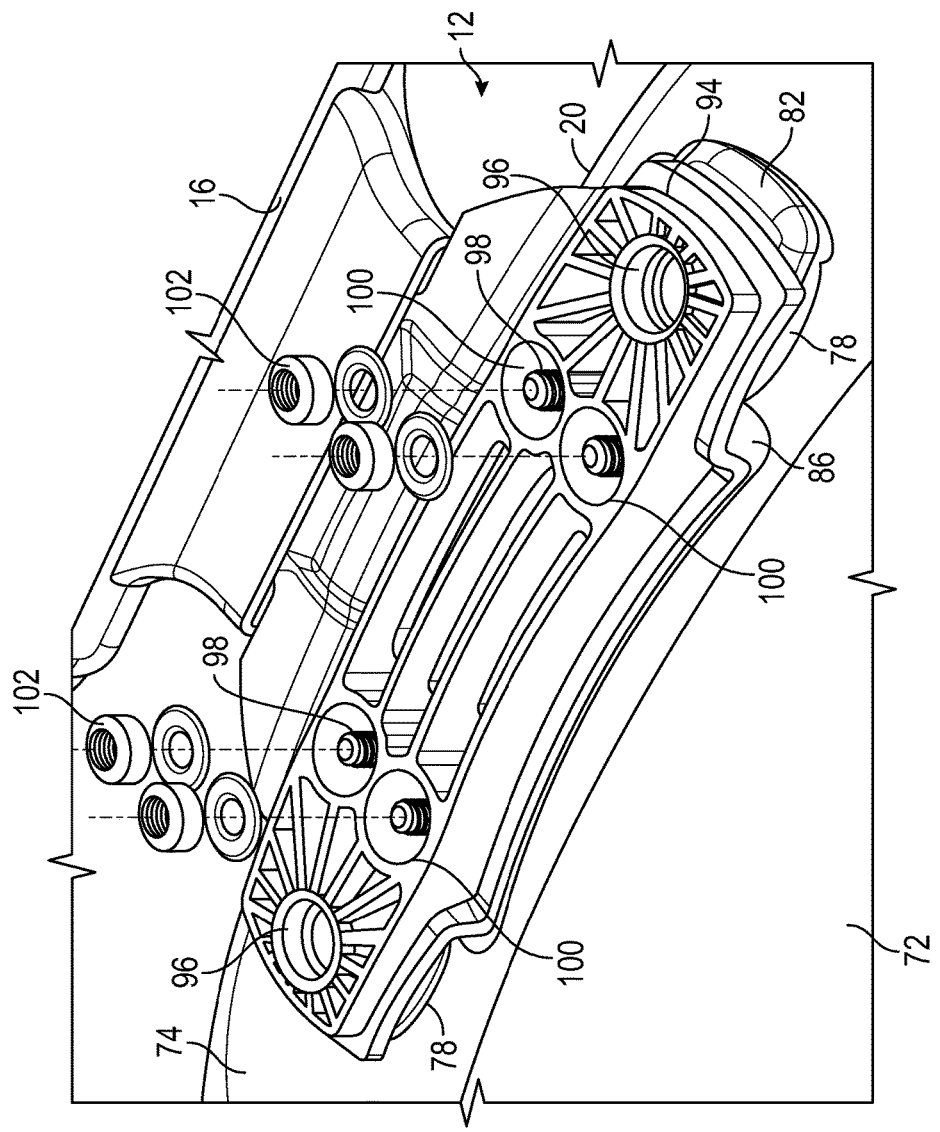
FIG. 11 is a schematic fragmentary perspective view of the seatback and a portion of the support structure overlapping the seatback, with a plurality of nuts and washers exploded from the support structure.

Additionally, the support structure 12 can include a cover mount 94 (see FIG. 11). The cover mount 94 can be formed from a high strength plastic. However, any suitable material can be used in forming the cover mount 94. The cover mount 94 is configured to be disposed over the base mount 86 and each of the strut holders 78 to sandwich the strut holders 78 therebetween. The cover mount 94 defines a plurality of passages 96 which are configured to align with respective openings 80 of the strut holders 78. The passages 96 are configured to receive respective struts 76 therein when the headrest 70 is reattached to the seatback 72. When the accessory assembly 10 is attached to the seatback 72, the headrest 70 is still adjustable relative to the seatback 72. Further, movement of the headrest 70 relative to the seatback 72 does not cause a corresponding change of position of the electronic device 16, i.e., the screen 18 or the hanger 22.

Turning to FIGS. 10 and 11, one or more fasteners 98 or studs extend from the base mount 86, and the cover mount 94 defines a plurality of mount holes 100, with respective fasteners 98 of the base mount 86 disposed through respective mounting holes of the cover mount 94. A nut 102 can be secured to each of the studs 98, such that the cover mount 94 is secured to the base mount 86.

Figure 12:
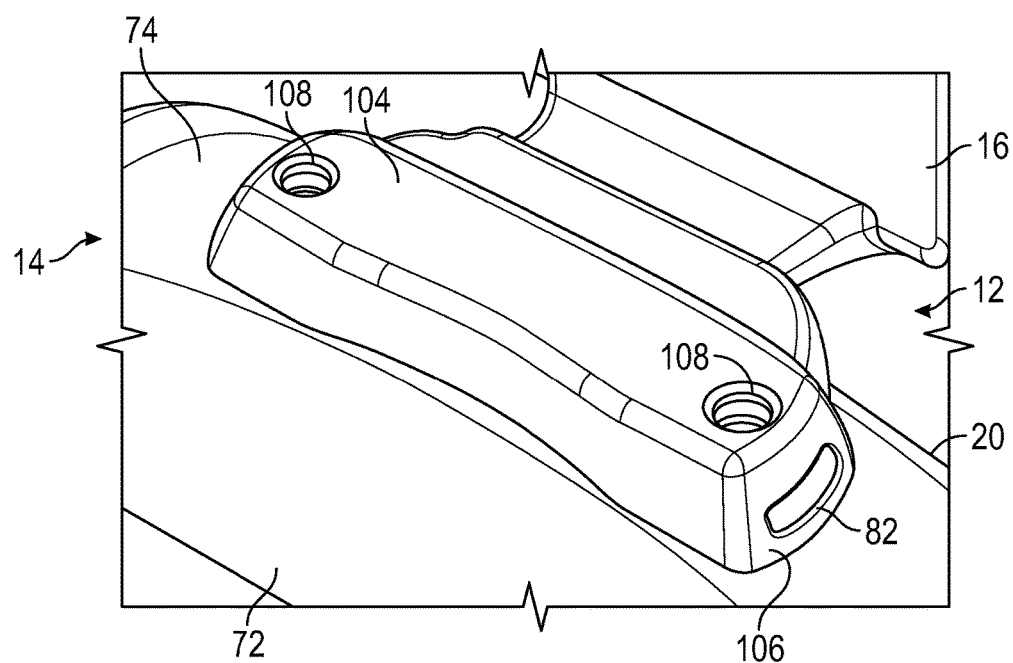
FIG. 12 is a schematic fragmentary perspective view of the seatback and a cover plate of the support structure.

Referring to FIGS. 2 and 12, the support structure 12 can include a cover plate 104 that is disposed over the cover mount 94 on the seatback 72. The cover plate 104 can be configured to be fastened, clipped, bolted, screwed, or otherwise attached or secured to the cover mount 94 and/or the base mount 86. The cover plate 104 is configured to provide a factory-fitted look to the accessory assembly 10 upon installation to the seatback 72. Further, the cover plate 104 can define a window 106 (as best shown in FIG. 12) through which the button 82 can extend or otherwise be accessible, to adjust the position of the headrest 70. Additionally, the cover plate 104 can define a plurality of passageways 108 that are configured to align with respective passages 96 of the cover mount 94 and respective openings 80 of the strut holders 78. The passageways 108 are configured to receive respective struts 76.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An accessory assembly for attachment to a seatback, the accessory assembly comprising:
   a support structure configured for attachment to the seatback;
   an electronic device operatively supported by the support structure and including a screen; and
   a hanger operatively supported by the electronic device and spaced from the screen such that the hanger does not obstruct the screen;
   wherein the hanger is shaped as human shoulders and includes a body and a first arm and a second arm extending from the body in opposite directions from one another;
   wherein the first arm includes a first portion and a first elbow;
   wherein the second arm includes a second portion and a second elbow;
   wherein the first portion extends between the body and the first elbow and the second portion extends between the body and the second elbow, such that the first elbow and the second elbow each extend beyond the peripheral edge of the electronic device in an opposite direction from one another; and
   wherein the first portion and the second portion of the hanger are spaced from the screen such that the hanger does not obstruct the screen so that the entire screen is viewable and the first portion and the second portion are positioned to support clothing thereon.

2. The accessory assembly as set forth in claim 1, wherein the electronic device includes a peripheral edge, with the hanger including a first portion and a second portion each extending at least partially beyond the peripheral edge such that a first opening is disposed between the first portion and the peripheral edge, and a second opening is disposed between the second portion and the peripheral edge.

3. The accessory assembly as set forth in claim 1, wherein the electronic device includes a first side and a second side opposing the first side, and wherein the screen is disposed on the first side, and the hanger and the support structure each engage the second side.

4. The accessory assembly as set forth in claim 1, wherein the electronic device includes a first edge and a second edge opposing each other and spaced apart from each other, and wherein the electronic device includes a third edge and a fourth edge opposing each other and spaced apart from each other, with the first and second edges each disposed adjacent to the third and fourth edges such that the first, second, third and fourth edges cooperate to present a peripheral edge, and wherein the hanger engages the third and fourth edges and is spaced from the first and second edges.

5. The accessory assembly as set forth in claim 1, wherein the electronic device includes a first edge and a second edge opposing each other and spaced apart from each other;
   wherein the electronic device includes a third edge and a fourth edge opposing each other and spaced apart from each other, with the first and second edges each disposed adjacent to the third and fourth edges such that the first, second, third and fourth edges cooperate to present the peripheral edge;
   wherein at least a portion of the first portion and at least a portion of the second portion of the hanger extend beyond the first edge of the electronic device; and
   wherein the first elbow extends beyond the third edge of the electronic device and the second elbow extends beyond the fourth edge of the electronic device.

6. The accessory assembly as set forth in claim 5, wherein the electronic device and the hanger are operatively attached to one another other at the body, such that the body is centrally disposed between the third edge and the fourth edge.

7. An accessory assembly configured to be attached to a seatback, the accessory assembly comprising:
   a support structure configured for attachment to the seatback;
   an electronic device including a screen, wherein the electronic device is surrounded by a peripheral edge and the electronic device is operatively supported by the support structure; and
   a hanger coupled to the electronic device;
   wherein the hanger includes a first portion and a second portion extending from the first portion, such that the hanger is shaped as human shoulders; and
   wherein the hanger is operatively supported by the electronic device with the first portion and the second portion offset from the screen such that the hanger does not obstruct the screen and the entire screen is viewable, while the first portion and the second portion are positioned to support clothing thereon.

8. An accessory assembly configured to be operatively connected to a vehicle seat, the accessory assembly comprising:
   a support structure configured for attachment to the vehicle seat;
   a housing having a first side and an opposing second side;
   wherein the housing is surrounded by a peripheral edge and is configured for supporting a screen of an electronic device on the first side thereof;
   wherein the housing is operatively supported by the support structure; and
   a hanger configured to be operatively supported by the housing, wherein the hanger includes a body and first and second portions extending from opposing ends of the body;
   wherein the hanger is configured to be removably secured to the second side of the housing such that the hanger does not obstruct the first side of the housing; and wherein the hanger is configured to be positioned between the housing and the vehicle seat when the accessory assembly is operatively connected to the vehicle seat.

9. The accessory assembly as set forth in claim 7, wherein the first portion and the second portion each extend at least partially beyond the peripheral edge, such that a first opening is disposed between the first portion and the peripheral edge, and a second opening is disposed between the second portion and the peripheral edge.

10. The accessory assembly as set forth in claim 7, wherein the electronic device includes a first side and a second side opposing the first side, and wherein the screen is disposed on the first side, and the hanger engages the second side.

11. The accessory assembly as set forth in claim 7, wherein the electronic device includes a first edge and a second edge opposing each other and spaced apart from each other, and wherein the electronic device includes a third edge and a fourth edge opposing each other and spaced apart from each other, with the first and second edges each disposed adjacent to the third and fourth edges such that the first, second, third, and fourth edges cooperate to present the peripheral edge, and wherein the hanger engages the third and fourth edges and is spaced from the first and second edges.

12. The accessory assembly as set forth in claim 7, wherein the hanger includes a body and first arm and a second arm extending from the body in opposite directions from one another;
wherein the first arm includes the first portion and a first elbow;
wherein the second arm includes the second portion and a second elbow; and
wherein the first portion extends between the body and the first elbow and the second portion extends between the body and the second elbow, such that the first elbow and the second elbow each extend beyond the peripheral edge of the electronic device in an opposite direction from one another.

13. The accessory assembly as set forth in claim 12, wherein the electronic device includes a first edge and a second edge opposing each other and spaced apart from each other;
wherein the electronic device includes a third edge and a fourth edge opposing each other and spaced apart from each other, with the first and second edges each disposed adjacent to the third and fourth edges such that the first, second, third, and fourth edges cooperate to present the peripheral edge;
wherein at least a portion of the first portion and at least a portion of the second portion of the hanger extends beyond the first edge of the electronic device; and
wherein the first elbow extends beyond the third edge of the electronic device and the second elbow extends beyond the fourth edge of the electronic device.

14. The accessory assembly as set forth in claim 13, wherein the electronic device and the hanger are operatively attached to one another other at the body, such that the body is centrally disposed between the third edge and the fourth edge.

15. The accessory assembly as set forth in claim 8, wherein the first portion and the second portion each extend at least partially beyond the peripheral edge such that a first opening is disposed between the first portion and the peripheral edge, and a second opening is disposed between the second portion and the peripheral edge.

16. The accessory assembly as set forth in claim 8, wherein the housing includes a first edge and a second edge opposing each other and spaced apart from each other, and wherein the housing includes a third edge and a fourth edge opposing each other and spaced apart from each other, with the first and second edges each disposed adjacent to the third and fourth edges such that the first, second, third and fourth edges cooperate to present the peripheral edge, and wherein the hanger engages the third and fourth edges and is spaced from the first and second edges.

17. The accessory assembly as set forth in claim 8, wherein the hanger further includes a first arm and a second arm extending from the body in opposite directions from one another;
wherein the first arm includes the first portion and a first elbow;
wherein the second arm includes the second portion and a second elbow;
wherein the first portion extends between the body and the first elbow and the second portion extends between the body and the second elbow, such that the first elbow and the second elbow each extend beyond the peripheral edge of the housing in an opposite direction from one another.

18. The accessory assembly as set forth in claim 17, wherein the housing includes a first edge and a second edge opposing each other and spaced apart from each other;
wherein the housing includes a third edge and a fourth edge opposing each other and spaced apart from each other, with the first and second edges each disposed adjacent to the third and fourth edges such that the first, second, third and fourth edges cooperate to present the peripheral edge;
wherein at least a portion of the first portion and at least a portion of the second portion of the hanger extends beyond the first edge of the housing;
wherein the first elbow extends beyond the third edge of the housing and the second elbow extends beyond the fourth edge of the housing; and
wherein the housing and the hanger are configured to be operatively attached to one another other at the body, such that the body is centrally disposed between the third edge and the fourth edge.

19. The accessory assembly as set forth in claim 8, further comprising an electronic device including the housing and the screen supported by the housing;
wherein the electronic device includes a first side and a second side opposing the first side, and wherein the screen is disposed on the first side, and the hanger is configured to engage the second side.

* * * * *